(12) United States Patent
Henson

(10) Patent No.: US 7,035,815 B1
(45) Date of Patent: *Apr. 25, 2006

(54) METHOD AND APPARATUS FOR COMPUTER SYSTEM ONLINE LEAD TIME ADVISOR

(75) Inventor: Kenneth C. Henson, Round Rock, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,165

(22) Filed: Aug. 31, 1999

Related U.S. Application Data

(63) Continuation-in-part of application No. 09/158,564, filed on Sep. 22, 1998, now Pat. No. 6,167,383.

(51) Int. Cl.
*G06F 17/60* (2006.01)

(52) U.S. Cl. .................................... 705/26
(58) Field of Classification Search ............. 705/26, 705/27, 80, 10, 1
See application file for complete search history.

(56) References Cited

U.S. PATENT DOCUMENTS

| | | |
|---|---|---|
| 4,977,390 A | 12/1990 | Saylor et al. |
| 5,502,806 A | 3/1996 | Mahoney et al. |
| 5,887,243 A | 3/1999 | Harvey et al. |
| 5,946,210 A * | 8/1999 | Montminy et al. .... 364/468.03 |
| 6,009,406 A * | 12/1999 | Nick ........................... 705/10 |
| 6,055,519 A * | 4/2000 | Kennedy et al. ............... 705/80 |
| 6,110,213 A * | 8/2000 | Vinciarelli et al. ............ 703/1 |
| 6,151,582 A * | 11/2000 | Huang et al. .................. 705/8 |

FOREIGN PATENT DOCUMENTS

WO    WO99/13411    *  3/1999

OTHER PUBLICATIONS

Frook, John, Cisco's $1 Billion Web Site, Communications Week, n641, p1+.*
Bartholomew, Doug, Trawling for $1 Billion, Apr. 21, 1997, Industry week, v 246, n8, p69+.*
Pang, Albert, E–Commerce Bonanza, Internet Computing, Mar. 1, 1998, v3 n3 p70–74.*
Joachim, David, E–Commerce Kingpin, Internet Week, Nov. 10, 1997, p. 1.*
Trommer Diane, Cisco expects to save $250M with net model, Electronic Buyers News, Jan. 6, 1997.n1039, p68.*

* cited by examiner

*Primary Examiner*—Jeffrey A. Smith
*Assistant Examiner*—Mark A. Fadok
(74) *Attorney, Agent, or Firm*—Haynes and Boone, LLP

(57) ABSTRACT

In a method and apparatus for advising on a lead time for a customer configured computer system, selection input from a customer is received. In response to the selection input, a customer computer system is configured. Lead time for the configured computer system is advised by outputting an estimated ship date for delivery of the configured computer system to the customer. The estimated ship date is a function of lead times of selected options of the configured computer system. Lead time is further advised by outputting a customer selectable option for optimizing the delivery, accordingly, the ship date.

25 Claims, 6 Drawing Sheets

METHOD AND APPARATUS FOR COMPUTER SYSTEM ONLINE LEAD TIME ADVISOR

This is a continuation-in-part of U.S. patent application Ser. No. 09/158,564, filed Sep. 22, 1998, now U.S. Pat. No. 6,167,383, issued Dec. 26, 2000.

BACKGROUND

The disclosures herein relate generally to build-to-order manufacturing of computer systems, and more particularly, to a method and apparatus for an online lead time advisor in the build-to-order manufacturing of a computer system.

This application relates to co-pending U.S. patent application Ser. No. 09/009,401, filed on Jan. 20, 1998, entitled "Method and Apparatus For Providing and Accessing Data at an Internet Site", naming Amy Van Wyngarden as inventor.

This application relates to co-pending U.S. patent application Ser. No. 09/158,564, filed on Sep. 22, 1998, entitled "Method and Apparatus For Providing Customer Configured Machines at an Internet Site", naming Ken Henson as inventor.

This application relates to co-pending U.S. patent application Ser. No. 09/244,473, filed on Feb. 4, 1999, entitled "System and Method For Identification and Streamlined Access to Online Services", naming David S. Springer as inventor.

This application relates to co-pending U.S. patent application Ser. No. 09/290,027, filed on Apr. 9, 1999, entitled "Interactive Upsell Advisor Method and Apparatus For Internet Applications", naming John W. Not and Andrew Heftily as inventors.

This application relates to co-pending U.S. patent application Ser. No. 09/344,072 filed on Jun. 25, 1999, entitled "Tool For Facilitating On-line Ordering of Build-to-order Product", naming David Clifton, Laurie Dolan, and Adam Moore as inventors.

These co-pending applications are incorporated herein by reference in their entirety, and are assigned to the assignee of the present invention.

Currently, while online shoppers or customers can effectively customize and configure computer systems using an online configuration, the online shoppers have no visibility to the affect each component selection has on their build-to-order computer system's estimated delivery time (i.e., no visibility to "lead time"). Unlike orders placed over the phone with the assistance of a sales representative, with online shopping, component selections are being made without consideration for lead time. Alternately, component selections are being made with the assumption that each selection will have no ill effect on lead time. In either case, customer satisfaction is at risk when component selections are made without forewarning as to their effect on lead time for the build-to-order computer system. Moreover, neither the phone nor Internet shopping experience offer a means to optimize system component selections for delivery time.

Further with respect to the current state of the art, online shoppers are offered static content describing a standard lead time, for example, one to two weeks, depending upon parts availability (e.g., see http://commerce.us.dell.com/storeinfo/delivery.htm). The ability to flag computer system options that will extend delivery beyond the normal lead time exists, but is not being utilized. This solution approach is considered too simplistic and problematic as it does not afford the online customer any substitution advice, nor offer the same level of servicing provided by a telephone sales representative. Lacking is an ability to guide customers to an acceptable system performance/lead time balancing selection.

Accordingly, the online shopping experience is significantly less than that offered via the telephone in this regard. When working with a sales representative over the telephone, customers may be guided to a system solution that best meets their delivery requirements. Representatives use their knowledge and access to lead time information reports to advise customers on long lead time options and suitable replacements. Still, such a process is not 100% reliable and accurate as it relies on the sales representative expertise and execution.

A method and apparatus for providing an interactive online lead time advisor in build-to-order manufacturing of a computer system is needed.

SUMMARY

According to one embodiment, in a method for advising on a lead time for a customer configured computer system, selection input is received from a customer. In response to the selection input, a customer computer system is configured. Lead time for the configured computer system is advised by outputting an estimated ship date for delivery of the configured computer system to the customer. The estimated ship date is a function of lead times of selected options of the configured computer system. Lead time is further advised by outputting a customer selectable option for optimizing the ship date.

The embodiments of the present disclosure provide a technical advantage in that a lead time is easily optimized with the interactive online lead time advisor of an online store for build-to-order manufacturing of a computer system.

BRIEF DESCRIPTION OF THE DRAWING FIGURES

DETAILED DESCRIPTION

The present embodiments provide a means for optimizing the lead time for a customer configured computer system. More specifically, a method and apparatus are provided for an online store having a configuration for configuring a customer's computer system. The configuration includes a lead time advisor for informing online shoppers of the lead time for a respective computer system, the lead time being based on current component selections. The lead time advisor takes into account the specific option(s) dictating the current lead time (i.e., the longest lead time component) and the effect that each component selection has upon the resultant system lead time.

Figure 1:
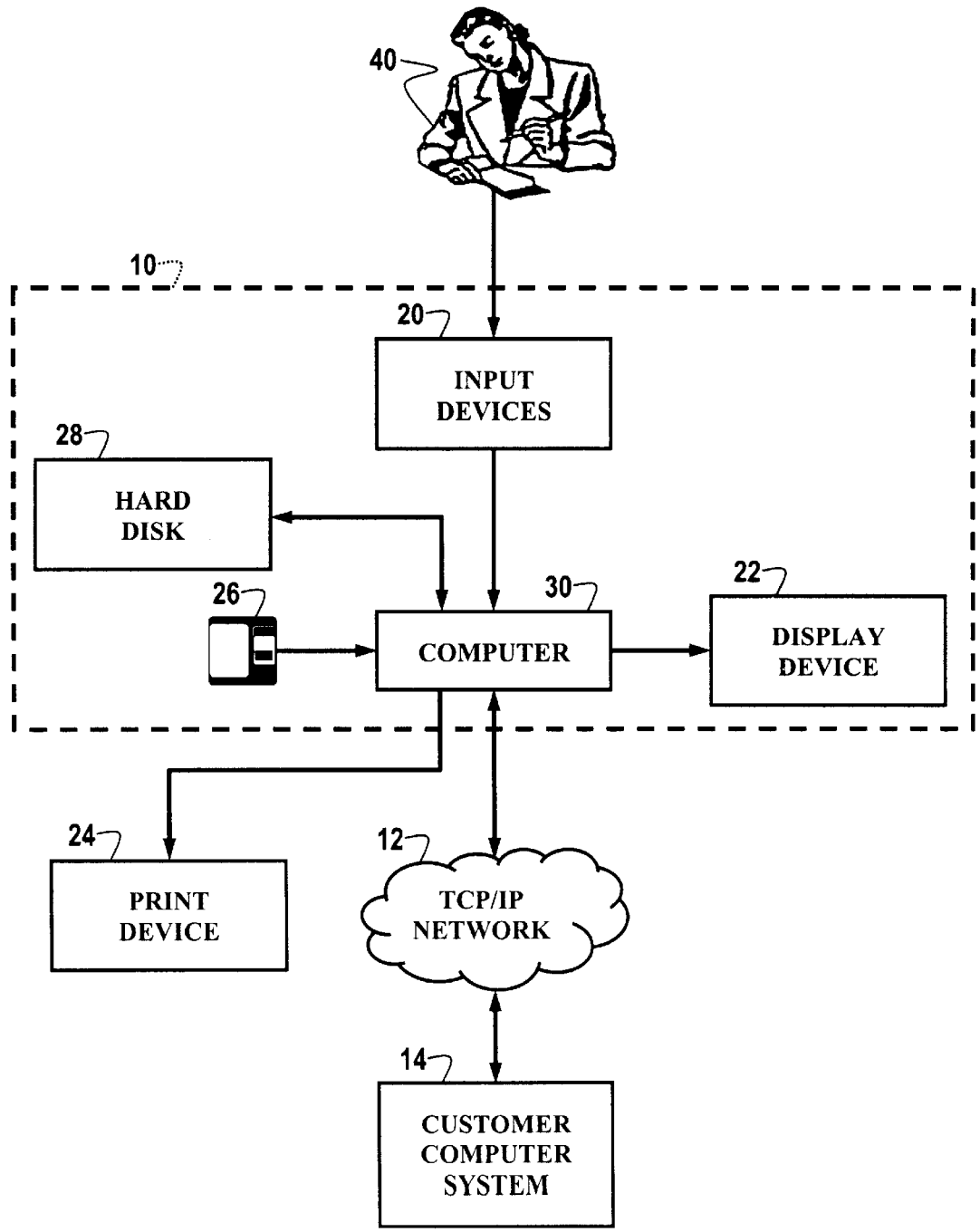
FIG. 1 is a block diagram view of an online store computer system according to an illustrative embodiment of the present disclosure.

FIG. 1 is a block diagram view of a computer system according to an illustrative embodiment of the present disclosure. A build-to-order (BTO) computer manufacturer computer system (alternately, an online store computer system) is generally indicated at 10 and includes various components. Computer system 10 is disposed for being coupled through a global network 12 to at least one customer computer system 14. The hardware components of computer system 10 are representative of potential hardware components (not shown for clarity) of computer system 14. Note that computer system 14 may include any suitable device, such as WebTV, etc., for communicating with BTO computer manufacturer computer system 10.

The BTO computer manufacturer computer system 10 includes input devices 20, a display device 22, a print device 24, and a computer 30 for executing processes and performing operations (e.g. communicating information) in response thereto as discussed further herein below. In the illustrative embodiment, computer 30 is an IBM-compatible personal computer ("PC") that executes Microsoft Windows 95, 98, NT, or other suitable operating system software. All Microsoft products identified herein are available from Microsoft Corporation, One Microsoft Way, Redmond, Wash. 98052-6399. In another illustrative embodiment, computer 30 is a network server having a suitable operating system.

Computer 30 is connected to input devices 20, display device 22 and print device 24. Display device 22 is, for example, a conventional electronic cathode ray tube. Print device 24 is, for example, a conventional electronic printer or plotter. Also, computer 30 includes internal speakers for outputting audio signals. In an alternative embodiment, the speakers are external to computer 30. Moreover, system 10 includes (a) a first computer-readable medium (or apparatus) 26 such as a floppy diskette and (b) a second computer-readable medium (or apparatus) 28 such as a computer hard disk. Computer-readable media (or apparatus) can also include a CD-ROM or other similar media.

A human user 40 and computer 30 operate in association with one another. For example, in response to signals from computer 30, display device 22 displays visual images, and user 40 views such visual images. Also, in response to signals from computer 30, print device 24 prints visual images on paper, and user 40 views such visual images. Further, user 40 operates input devices 20 in order to output information to computer 30, and computer 30 receives such information from input devices 20.

Input devices 20 include, for example, a conventional electronic keyboard and a pointing device such as a conventional electronic "mouse", roller ball, touch pad, light pen, or other similar device. User 40 operates the keyboard to output alphanumeric text information to computer 30, and computer 30 receives such alphanumeric text information from the keyboard. User 40 operates the pointing device to output cursor-control information to computer 30, and computer 30 receives such cursor-control information from the pointing device.

Computer 30 is structurally and functionally interrelated with each of its connected computer-readable media (e.g., computer-readable media 26 and 28), as described further herein below. For example, floppy diskette 26 stores (e.g. encodes, records, or embodies) functional descriptive material (e.g. including but not limited to computer programs (also referred to as software or applications) and information structures). Such functional descriptive material imparts functionality when encoded on floppy diskette 26. Also, such functional descriptive material is structurally and functionally interrelated to floppy diskette 26.

Within such functional descriptive material, information structures define structural and functional interrelationships between such information structures and floppy diskette 26 (and other aspects of system 10). Such interrelationships permit the information structures' functionality to be realized. Also, within such functional descriptive material, computer programs define structural and functional interrelationships between such computer programs and floppy diskette 26 (and other aspects of system 10). Such interrelationships permit the computer programs' functionality to be realized.

For example, computer 30 reads (e.g. loads, accesses, or copies) such functional descriptive material into a computer memory device (e.g. random access memory device ("RAM")) of computer 30, and computer 30 performs its operations (as described elsewhere herein) in response to such material which is stored in such memory device. More particularly, computer 30 performs the operation of processing (e.g. executing) a computer application (that is stored, encoded, recorded or embodied on a computer-readable medium) for causing computer 30 to perform additional operations (as described elsewhere herein). Accordingly, such functional descriptive material exhibits a functional interrelationship with the way in which computer 30 executes its processes and performs its operations.

Further, floppy diskette 26 is an apparatus from which the computer application is accessible by computer 30, and the computer application is process able by computer 30 for causing computer 30 to perform such additional operations. In addition to reading such functional descriptive material from floppy diskette 26, computer 30 is capable of reading such functional descriptive material from (or through) a computer network 12 which is another type of computer-readable medium (or apparatus) connected to computer 30. Also, the memory devices (of computer 30) are themselves computer-readable media (or apparatus).

Network 12 is a transport control protocol/Internet protocol ("TCP/IP") global computer network such as the Internet or other similar network. For communicating with (i.e. outputting information to, and receiving information from) network 12, computer 30 includes a network interface card ("NIC"), modem, or other suitable connection, which is yet another type of computer-readable medium (or apparatus) connected to computer 30. A customer computer system 14 is illustratively shown as being coupled for communicating with system 10 through the global network 12.

Figure 2:
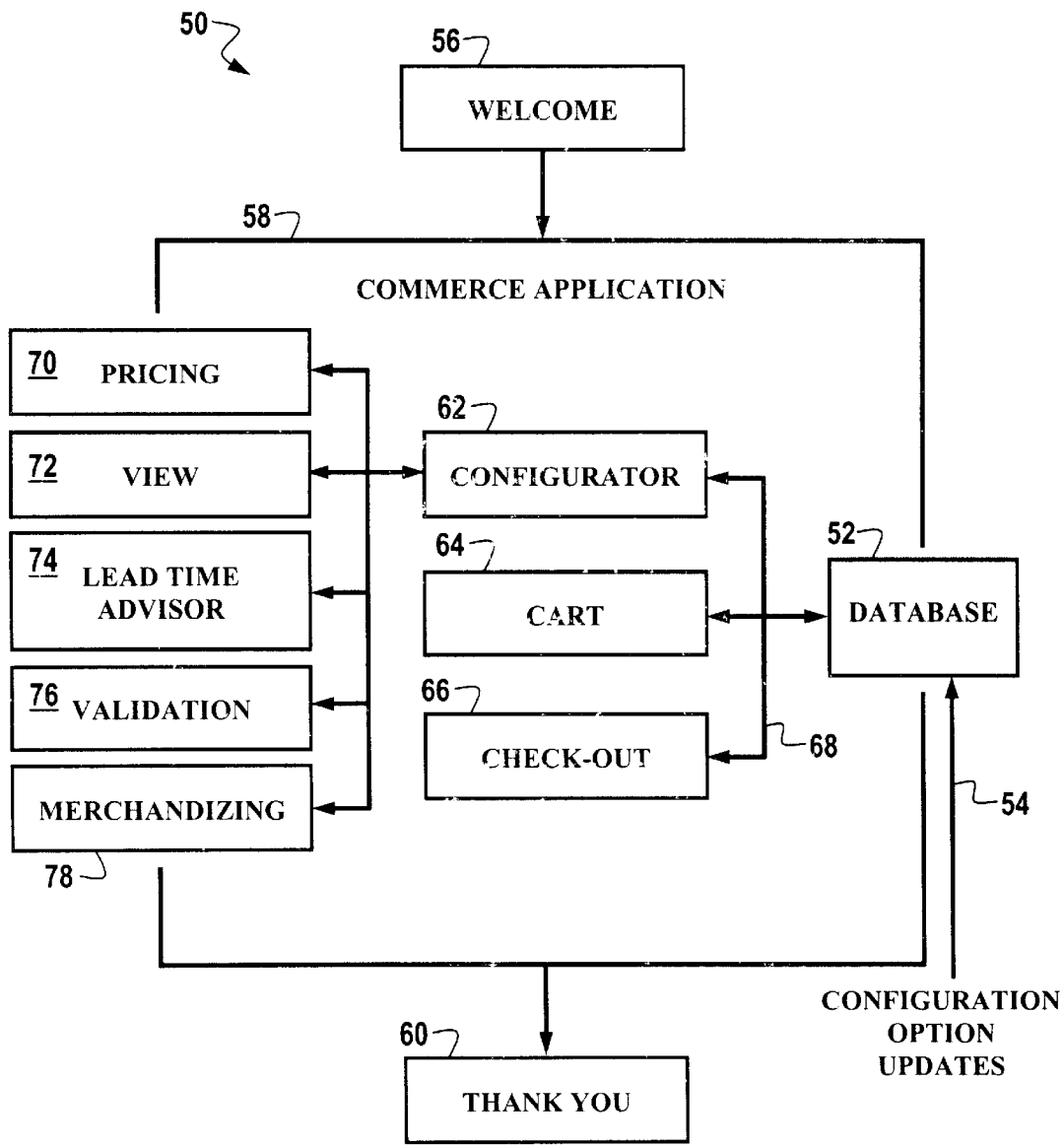
FIG. 2 is block diagram view representation of an on-line store according to an illustrative embodiment of the present disclosure.

FIG. 2 is a functional block diagram view of the BTO computer manufacturer website and various components thereof. In an illustrative embodiment, the BTO computer manufacturer website 50 is hosted by computer system 10 and/or computer 30 for executing processes (or "modules") to perform various operations. Each module contains suitable computer program code process able by the computer for causing the computer to perform a respective operation or operations, as discussed herein. Computer program code is stored on computer readable media, such as hard disk 28, floppy disk 26, or other suitable computer readable media (FIG. 1).

Website 50 further includes a database of configuration options. Database 52 may be maintained, for example, on hard disk 28 (FIG. 1) or other suitable digital storage. Configuration options 54 are updated on a periodic schedule, or as needed, with configuration option updates. The various processes of the modules discussed herein below interact with one another according to the illustrative embodiments of the lead time advisor method of the present disclosure. As discussed herein, the modules include computer program code process able by the computer for causing the computer to perform the respective operations as described.

In conjunction with the present embodiments, the BTO computer manufacturer website is an on-line store which includes an Internet website for which a customer may access to configure a particular computer system, i.e., according to desired options of the customer. The on-line store can include a subset of a larger Internet website. While accessing the on-line store, a customer can select one or more products that the customer is interested in. Upon selection of a particular product, the on-line store presents the customer with the ability to access product information for the particular product, customize the product, price the customized product, purchase the product, and conduct other actions as discussed herein. While shopping happens within the website (i.e., selection of a particular kind of system (chassis) by a customer), when the customer is ready to purchase a customized system, the customer is accordingly directed (invisibly) to that part of the website which the on-line store application controls.

Referring still to FIG. 2, the present implementation of an online store 50 for use in generating customer configured computer systems will be discussed. The online store 50 includes a welcome or introductory module 56, a commerce application module 58, and a thank you module 60 (i.e., appreciation for your order). The present embodiments further include an enhanced online store user interface which advantageously enables the system configuration, pricing, and ordering of a computer system via the Internet. The commerce application 58 includes a configuration 62, shopping cart 64, checkout 66, and database 52. The database 52 provides information to the configuration 62, shopping cart 64, and checkout 66, as illustrated by 68. The configuration 62 includes a pricing module 70, a view module 72, a lead time advisor module 74, a validation (or compatibility) warning module 76, and a merchandising module 78. The various modules of the configuration 62 are being driven by data from the database 52, as further discussed herein below.

The online store 50 includes welcome page 56, configuration page 62, cart 64, checkout 66, and thank you page 60. The welcome page 56 includes a static page and generally resides outside of the commerce application 58. The configuration, cart, and checkout are within the commerce application and are prone to be driven off the database, thus the configuration, shopping cart, and checkout are each linked to the database as illustrated in FIG. 2. The checkout includes a payment feature, delivery feature, personal verses business feature, and instructional ext features (i.e., how to fill out an online form).

The welcome page 56 is typically a static introductory page and includes a link into the online store 50. The online store 50 includes a smart process for the configuration 62, cart 64, and checkout 66 which are all driven by the database 52. Upon completion of a checkout, a customer would be linked to a static thank you page 60. The thank you page 60 provides a message of gratitude to the customer for having placed the order or for visiting the online store.

As discussed herein, the online store of the present disclosure includes a smart process. The degree of smartness of the present online store is greater than that of a prior online store, wherein a level of smartness in the prior online store was focused on the configuration. The configuration of the prior online store would present to the user a particular computer system selected from the welcome page, the computer system including available options. The smartness of the prior online store was in describing the choices for the system which the customer had selected. The present online store takes into account that some choices are not as right as others. Accordingly, the configuration of the present online store has been made smarter.

A level of smartness has been added to the configuration, where such a level of smartness did not exist previously. Thus the smartness of the configuration has been improved. Programming code for executing the improved smartness and the added smartness can be included in a separate programming module or software package or can be integral with the online store commerce application. The database and the online commerce application that drives the database make up the online store. The database can be included within the commerce application of the online store, also. Programming code and the functions as described herein may be implemented using programming techniques well known in the art.

Referring still to FIG. 2, aspects of the configuration 62 which are being driven by the database 52 are illustrated. In essence, the entire configuration 62 is being driven by the database. As mentioned, the configuration 62, shopping cart 64, and checkout 66 are each part of the commerce application 58 and subject to be driven by the database 52. For example, with the configuration 62 there can be provided lead time information and/or alternate lead time recommendation information coupled with a particular system which has been configured by an online store customer, as will be discussed further herein below.

Referring again to FIG. 1, a customer can access the online store 50 using any suitable computer equipment 14, via the network or Internet 12. The computer equipment 14 may include a display, computer, keyboard, and pointing device, etc. The display is used for displaying the various pages of the online store while a customer is accessing the online store.

Figure 3:
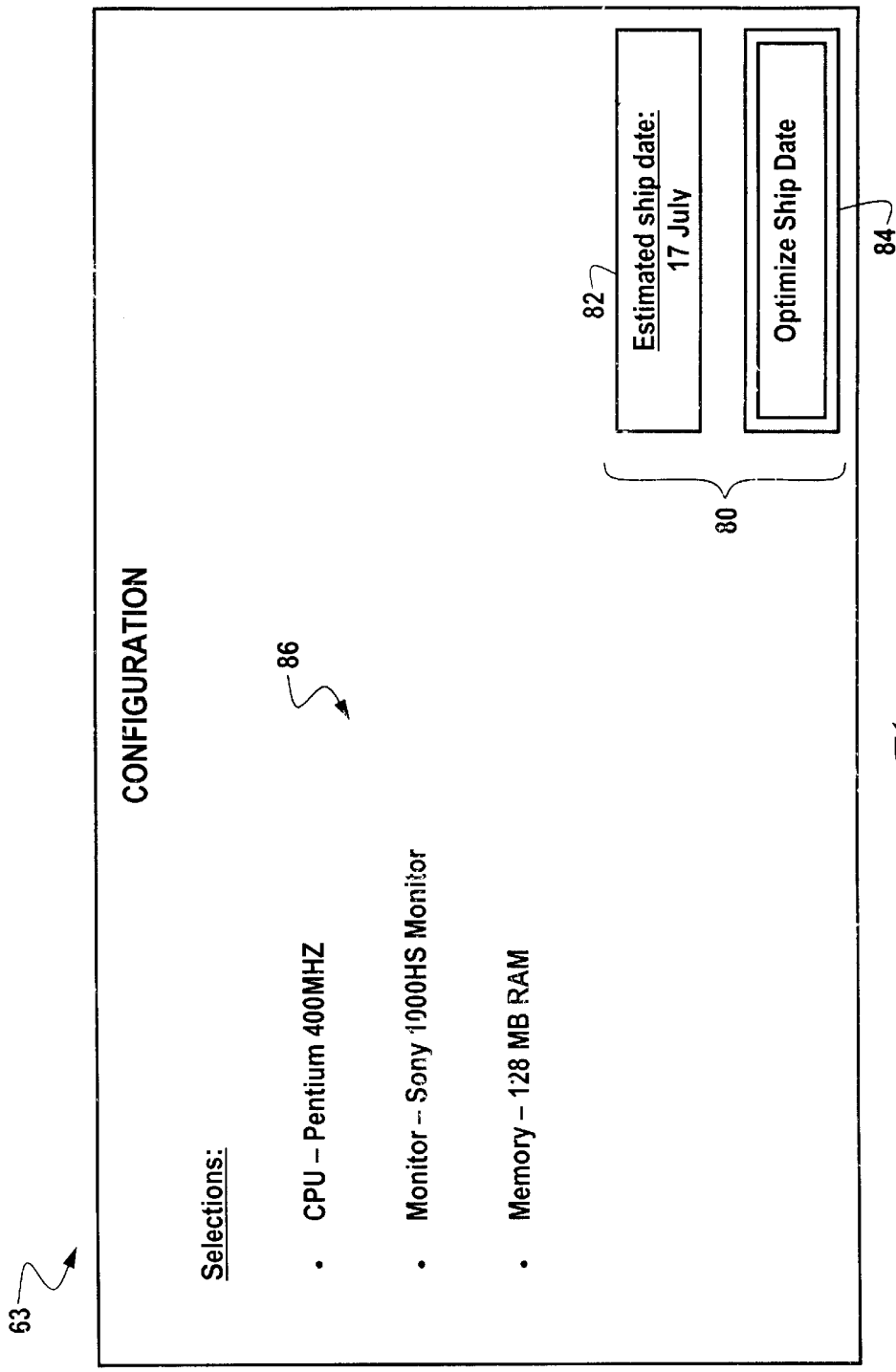
FIG. 3 is an exemplary screen view of an online store configuration display including an optimize delivery option of the lead time advisor according to an illustrative embodiment of the present disclosure.

According to the present embodiments, online configuration 62 includes a lead time advisor 74 having at least two components. First, the lead time advisor 74 includes a "lead time" display 80, as illustrated in FIG. 3, having an estimated ship date 82 and an optimize ship date (i.e., delivery) option 84. The lead time display 80, similar to an online configuration price display, is provided for displaying a current lead time based upon a current computer system configuration of component selections. The lead time is preferably displayed in terms of days, however, any other suitable time measure may be utilized as may be desired for a particular online store application. Lead time display 80 accordingly displays an estimated ship date 82 based upon the lead times of the current configuration component selections.

Figure 4:
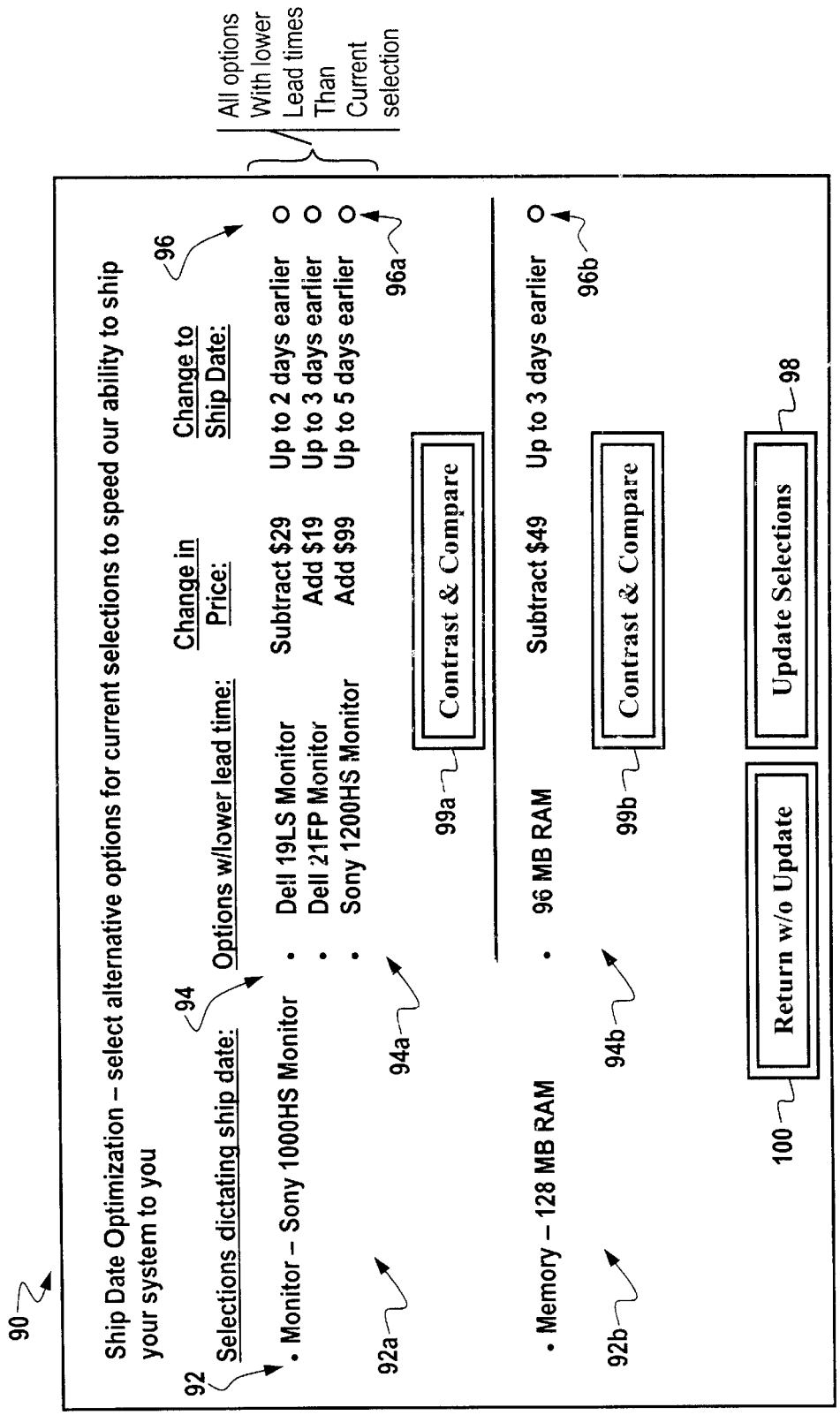
FIG. 4 is an exemplary screen view of a delivery recommendation output of the lead time advisor including an update selections option according to an illustrative embodiment of the present disclosure.

Secondly, the lead time advisor includes an "option advisor" section generally indicated at 90 (FIG. 4). The option advisor 90 is activated upon selection of the optimize ship date selection button 84 of the configuration display 63 (FIG. 3). The option advisor 90 includes a display section for displaying the option or options 92 dictating the current lead time. For instance, in the illustrative embodiment of FIG. 4, the components of the customer configured computer system resulting in the July 17 ship date 82 (FIG. 3) includes a Sony 1000HS Monitor 92a and the 128 MB RAM 92b. The Sony 1000HS Monitor and 128 MB RAM are part of the configuration of FIG. 3 generally indicated at 86.

Referring again to FIG. 4, options 92a and 92b dictate the current lead time as identified for the customer in the option advisor display 90. Option 92 may include any hardware, software and/or other system component included in a customer order. The lead time of component parts which can make up a customer configured computer system is subject to change on a regular basis. Accordingly, database 52 is updated with lead time information via configuration option updates 54 (FIG. 2). The various functions of lead time advisor 74 as discussed herein are accomplished using prescribed rules or combination of rules in connection with or derived from existing option data in the database 52.

In addition, the lead time option advisor display 90 of FIG. 4 provides at least one recommendation 94 (if any) of suitable, lower lead time replacement(s) or alternative(s) which can be effected. Should the online shopper decide to accept the at least one recommendation 94, then the online shopper selects a desired one of the at least one recommendation using the button or selection input 96. If more than one recommendation is displayed, then a respective selection button or input 96 is provided for each.

In one illustrative embodiment, the at least one recommendation 94 includes an identification and/or description. As shown in FIG. 4, the recommendation for an alternate selection for the SONY 1000 HS Monitor includes three options 94a which can result in a lowered lead time if selected. The three options include a Dell 19LS Monitor, a Dell 21FP Monitor, and a SONY 1200 HS Monitor. The recommendation further includes change in price messaging, for example, Subtract $29, Add $19, and Add $99, as shown for each of the respective recommendations 94a. The recommendation may still further include an indication on lead time improvement such as change to ship date of a prescribed number of days earlier.

In an illustrative embodiment, at prescribed instances, lead time advisor 74 systematically reads the lead time stored in the online store database 52 for each of a currently selected component of the customer configured system. Of the lead times read, lead time advisor 74 identifies a worst case lead time, corresponding to a longest lead time. Upon identifying the longest lead time, lead time advisor calculates the estimated ship date 82 based upon the current date and the identified longest lead time. For example, if the current date were July 7 and the longest lead time was 10 days, then the estimated ship date would be July 17. The estimated ship date is indicated at 82 in FIG. 3. As options are changed by the customer and/or recognized by the online store web servers, this lead time determination is again made and the lead time display 80 updated.

Concurrent with the lead time display determination, lead time advisor 74 identifies the particular option (or options if the options have equal long lead times) dictating the long lead time to be displayed. Lead time advisor 74 of the online store commerce application 58 displays the identified options at 92 of display 90 (FIG. 4) to the online shopper. Lead time advisor 74 outputs at least one recommendation 94 as to a suitable, lower lead time replacement option, the replacement option being associated with a corresponding long lead time option. Lead time advisor 74 reads the at least one recommendation from the online store database 52. The at least one recommendation is presented at 90, for example, on the customer computer system display for customer consideration. The customer may then select a desired one of the recommendations by clicking upon a selection button or input 96 for a respective one of the at least one recommendations. Note that only a single selection of the at least one recommendations is allowed. The customer then selects (clicks on) an update selections button 98, indicating an acceptance of a particular recommendation as selected via corresponding selection button 96. Alternatively, the customer may choose to return to the configuration screen 63 without updating the configuration by selecting (clicking upon) return 100.

Note that upon selection of the recommendation, such as by clicking on an update selections button 98, the lead time advisor process returns to the configuration screen 63, wherein a new lead time indication will be dictated by the then longest lead time component of the customer configured computer system. Should the online shopper decide to not accept the recommendation, then by clicking on a return button 100, the lead time advisor 74 returns the online shopper to the configuration screen 63 without updating the configuration. From the configuration screen, the online shopper can place the configured computer system in the shopping cart and proceed to check-out.

As shown in FIG. 4, each recommendation includes a corresponding change to ship date indication. The change to ship date refers to a potential lead time improvement indication by a prescribed number of days, e.g., up to 2 days earlier, up to 3 days earlier, etc. Lead time advisor 74 calculates the lead time improvement differential or delta, for example, by taking the difference between the lead time of the prior component and the lead time of the at least one recommendation. In addition, each alternate recommendation includes a change in price indication. Lead time advisor 74 calculates the change in price differential by taking the difference between the price of the prior component and price of the at least one recommendation.

According to an embodiment of the present disclosure, presentation of the delivery/lead time related information can be carried out in two parts. In a first part, online store computer system 10 provides a simple display 80 of the estimated delivery time 82 based upon a read of current system component selections (FIG. 3). The display 80 includes the ability to access, via hyperlink 84, advice and assistance on how to improve or optimize delivery time (i.e., ship date). In a second part, lead time advisor 74 of online store computer system 10 provides a dynamic database-driven web page where the option(s) dictating the current displayed delivery time and any identified recommendations are presented for customer consideration. Ship date of any one component may be affected, for example, because the particular component is currently out of stock, etc. The two-part display is implemented in recognition of space limitations with the online configuration, however, the same could be implemented on a single web page.

The delivery recommendation page allows for the acceptance of recommendations offered at 94 via select button 96 and, with selection of the "Update" key/button 98. Lead time advisor then returns the online shopper to the online configuration with the optimized lead time option selection as chosen by the customer.

Referring once again to FIG. 4, in the illustrative embodiment, lead time advisor 74 identified two selections dictating the current ship date. These selections included the SONY 1000 HS Monitor 92a and 128 MB RAM memory 92b. In this example, the online shopper is required to make a selection with respect to both components 92a and 92b in order for the ship date to be optimized. In other words, for ship date optimization, the online shopper can select a recommendation for each option 92a and 92b as presented by lead time advisor 74 to speed the BTO computer manufacturer's ability to ship the configured system to the customer. The online shopper can select any of the alternate selections by activating a corresponding selection button 96a, 96b, as appropriate.

Further, in connection with the illustrative example of FIG. 4, lead time advisor 74 can output an error message. The error message could address the scenario where the online shopper selects an alternate recommendation for one of the displayed options 92a or 92b, but not both, and clicks the update selections button 98. The error message would alert the online shopper that the ship date will not be changed unless a selection is chosen for each of the identified long lead time options.

Figure 5:
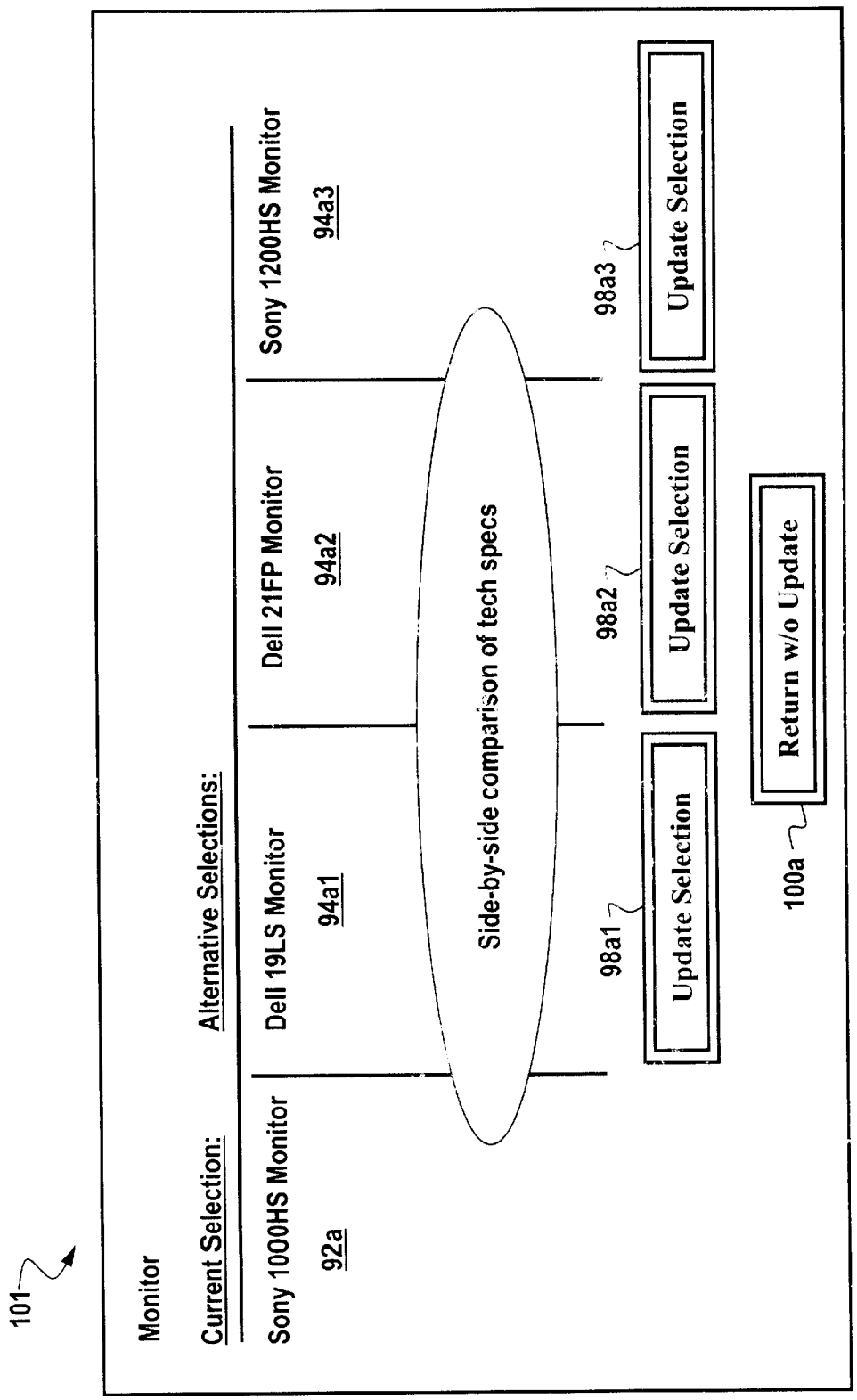
FIG. 5 is an exemplary screen view of a contrast and compare output of the lead time advisor according to an illustrative embodiment of the present disclosure.

Lead time advisor 74 further provides a contrast and compare option, selected by activation of contrast and compare button 99a, 99b, accordingly (FIG. 4). Upon selection of a contrast and compare button, the lead time advisor advances to a contrast and compare screen display 101, such as shown in FIG. 5. The contrast and compare display includes details of the respective current selection 92a and details of alternative selections $94a_1$, $94a_2$, and $94a_3$ to enable the online shopper to make a side-by-side comparison of respective technical specifications. Update selection buttons $98a_1$, $98a_2$, $98a_3$ are provided for enabling a selection of a respective update. A return to the configuration display without updating is achieved by selecting the return without update button 100a. The contrast and compare option display allows an online shopper to perform a contrast and comparison between options that reduce lead time and accelerate the ship date. The contrast and compare display provides the online shopper with information for the online shopper to make a smart decision among the alternatives that reduce lead time.

In this way, the online shopper is not only afforded the lead time assistance currently sacrificed in choosing to shop and buy online, but also are provided more reliable, complete, and accurate lead time advice/assistance.

In an instance where there is no alternative choice for a selected option 92 (the selected option dictating the current ship date) that would allow a reduction in lead time, one or more of the following may be implemented. In an alternate embodiment, clicking upon the optimize ship date button 84 (FIG. 3) can provide suitable messaging on the optimize page 90 (FIG. 4) indicating that no alternate choice is currently available. In other words, the messaging may indicate that selection of the option (a monitor in the example) is required, but there is nothing that can be done to optimize the ship date (as no other option exists or has a lower lead time). Messaging on the optimize page 90 may also indicate that selection of the option is not required, so de-selecting the option is the optimization recommendation (as no other alternative option exists or has a lower lead time).

Still further, the optimize ship date button 84 could be made a "smart" button. That is, the optimize ship date button 84 would be displayed in instances when there exists a better alternative choice for the option dictating the current lead time. In instances where no alternative choice for the option dictating the current lead time exists, then the optimize ship date button 84 would not appear or be displayed for the given configuration.

Other variations are also possible. For example, an icon or symbol representative of a long lead time may be used on the configuration screen to identify the option(s) dictating the current ship date. Shoppers could then de-select a give option, as desired.

Figure 6:
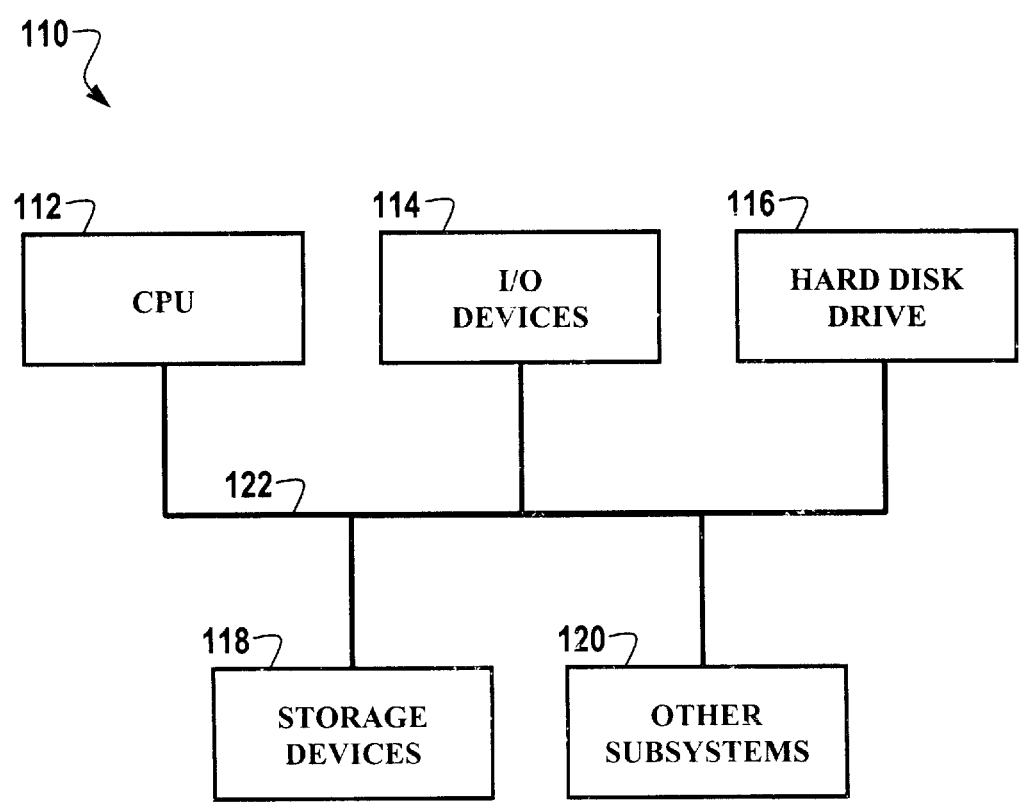
FIG. 6 is an exemplary computer system configured by a customer.

Referring now briefly to FIG. 6, a system block diagram of a custom configured computer system 110 is shown having features thereof configured in accordance a customer configured computer system order as discussed herein. The computer system 110 includes a central processing unit (CPU) 112, input/output (I/O) devices, such as a display, a keyboard, a mouse, and associated controllers, collectively designated by a reference numeral 114, a hard disk drive 116, and other storage devices, such as a may include a floppy disk drive, CD-rom drive, and the like, collectively designated by a reference numeral 118, and various other subsystems, such as a network interface card (or NIC), collectively designated by a reference numeral 120, all interconnected via one or more buses, shown collectively in FIG. 6 as a bus 122.

As discussed herein, a method for advising on lead time for delivery of a customer configured computer system includes receiving selection input from a customer for configuring the customer computer system. The selection input is received through an online store server. A configuration configures the customer configured computer system in accordance with the selection input. Upon configuring the customer configured computer system, lead time advising for the customer computer system includes outputting an estimated ship date for delivery of the configured computer system to the customer. The estimated ship date is a function of lead times of selected options of the customer configured computer system. A customer selectable option for optimizing the delivery is also output.

Accordingly, a lead time advisor online store computer system apparatus comprises a device (online store computer) for receiving selection input from a customer; configuring a customer computer system in response to the selection input; and advising on lead time for the configured computer system. Advising on lead time includes outputting an estimated ship date for delivery of the configured computer system to the customer. The estimated ship date is a function of lead times of selected options of the configured computer system. The online store computer system further outputs a customer selectable option for optimizing the delivery. Online store computer system also comprises apparatus for storing a computer program accessible by the online store computer 30 and process able by the online store computer 30 for causing the online store computer 30 to perform the receiving, configuring and advising.

The online store computer system apparatus is for receiving an optimize delivery selection request from the customer. In response to the optimize delivery selection request the online store computer system identifies at least one component of the customer configured computer system having a lead time that impacts the estimated ship date by a maximum lead time amount. The online store computer system identifies at least one recommendation as an alternate component selection for the at least one identified component. The at least one recommendation has an impact for reducing the estimated ship date.

In response to the optimize delivery selection request, online store computer system outputs the at least one recommendation for consideration by the customer. The at least one recommendation includes at least one of an alternate component identification and description. The at least one recommendation may also include a price differential for the at least one recommendation, wherein the price differential being calculated with respect to a price of the customer configured computer system absent the optimize delivery recommendation. The at least one recommendation can also include a lead time differential for the at least one recommendation, the lead time differential being calculated with respect to a lead time of the customer configured computer system absent the optimize delivery recommendation.

In another illustrative embodiment, the online store computer system outputs the at least one recommendation for consideration by the customer, wherein no more than one of the at least one recommendation is selectable by the customer. The online store computer system is for receiving an update selections input from the customer, the update selections input indicating customer acceptance of a desired one of the at least one recommendation. The online store computer system updates the configuration in response to the update selections input.

With the online store computer system, at least one of the receiving and outputting is through a global network. In one embodiment, the global network includes a telephone network for communicating digital signals. In addition, the telephone network is for communicating digital signals through a modem connection. In an alternate embodiment, the global network includes a global computer network. The global computer network can include the Internet and/or the World Wide Web.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method for providing an interactive online lead time advisor for a customer configured computer system comprising:
    providing an online store computer system linked to a computer network for:
        receiving selection input from a customer;
        configuring a customer computer system of desired components in response to the selection input; and
        advising on a lead time for the customer configured computer system, wherein advising on lead time includes:
            outputting data representative of an estimated ship date for delivery of the customer configured computer system to the customer, wherein the estimated ship date is determined as a function of individual lead times of the desired components of the customer configured computer system;
            outputting a customer selectable option configured for optimizing the ship date in response to a selection of the desired components by the customer; and
            responsive to receiving the optimize ship date selection request:
                identifying a desired component of the customer configured computer system having a lead time that impacts the estimated ship date by a maximum lead time amount;
                identifying a recommendation configured to reduce an impact on the estimated ship date as an alternate component selection compatible with the desired component selection; and
                outputting data representative of the recommendation for consideration by the customer, the recommendation including an alternate component identification.

2. The method of claim 1, wherein the recommendation includes a price differential for the recommendation, the price differential being calculated with respect to a price of the customer configured computer system absent the optimize ship date recommendation.

3. The method of claim 1, wherein the recommendation includes a lead time differential for the recommendation, the lead time differential being calculated with respect to a lead time of the customer configured computer system absent the optimize ship date recommendation.

4. The method of claim 1, and comprising:
    receiving an update selection input from the customer, the update selection input indicating customer acceptance of the recommendation; and
    updating the configuration in response to the update selection input.

5. The method of claim 1, and comprising:
    providing apparatus for storing a computer program accessible by an online store computer system and processable by the online store computer system for causing the online store computer system to perform the receiving, configuring and advising.

6. The method of claim 1, wherein at least one of the receiving and outputting is through a global network.

7. The method of claim 6, wherein at least one of the receiving and outputting comprises:
    having the global network include a telephone network for communicating digital signals.

8. The method of claim 7, wherein at least one of the receiving and outputting comprises:
    having the telephone network for communicating digital signals through a modem connection.

9. The method of claim 6, wherein at least one of the receiving and outputting comprises:
    having the global network include a global computer network.

10. The method of claim 9, wherein at least one of the receiving and outputting comprises:
    having the global computer network include a network selected from the group consisting of the Internet and the World Wide Web.

11. A computer system providing an interactive online lead time advisor for a customer configured computer system comprising:
    a manufacturer computer system linked to a global computer network for:
        receiving selection input from a customer;
        configuring a customer computer system of desired components in response to the selection input; and
        advising on a lead time for the customer configured computer system, wherein advising on lead time includes:
            outputting data representative of an estimated ship date for delivery of the customer configured computer system to the customer, wherein the estimated ship date is determined as a function of individual lead times of the desired components of the customer configured computer system;
            outputting a customer selectable option configured for optimizing the ship date in response to a selection of the desired components by the customer; and
            responsive to receiving the optimize ship date selection request:
                identifying a desired component of the customer configured computer system having a lead time that impacts the estimated ship date by a maximum lead time amount;

identifying a recommendation configured to reduce an impact on the estimated ship date as an alternate component selection compatible with the desired component selection; and outputting data representative of the recommendation for consideration by the customer, the recommendation including an alternate component identification.

12. The system of claim 11, wherein the recommendation includes a price differential for the recommendation, the price differential being calculated with respect to a price of the customer configured computer system absent the optimize ship date recommendation.

13. The system of claim 11, wherein the recommendation includes a lead time differential for the recommendation, the lead time differential being calculated with respect to a lead time of the customer configured computer system absent the optimize ship date recommendation.

14. The system of claim 11, wherein the device is further for:

receiving an update selection input from the customer, the update selection input indicating customer acceptance of the recommendation; and updating the configuration in response to the update selection input.

15. The system of claim 11, and comprising:

apparatus for storing a computer program accessible by said device and processable by said device for causing said device to perform the receiving, configuring and advising.

16. The system of claim 11, wherein the global network includes a telephone network for communicating digital signals.

17. The system of claim 16, wherein the telephone network is for communicating digital signals through a modem connection.

18. The system of claim 11, wherein the global computer network includes a network selected from the group consisting of the Internet and the World Wide Web.

19. A computer program product including a computer program processable to provide an interactive online lead time advisor for a customer configurable computer system comprising:

the computer program processable by an online computer system for causing the first computer system to:

link to a global computer network;

provide an interactive online lead time advisor for a customer configured computer system;

receive selection input from a customer;

configure a customer computer system of desired components in response to the selection input; and advise on a lead time for the customer configured computer system, wherein advise on lead time includes:

output data representative of an estimated ship date for delivery of the customer configured computer system to the customer, wherein the estimated ship date is determined as a function of individual lead times of the desired components of the customer configured computer system;

output a customer selectable option configured for optimizing the ship date in response to a selection of the desired components by the customer;

receive an optimize ship date selection request from the customer, and responsive to receiving the optimize ship date selection request:

identify a desired component of the configured computer system having a lead time that impacts the estimated ship date by a maximum lead time amount;

identify a recommendation configured to reduce an impact on the estimated ship date as an alternate component selection compatible with the desired component selection; and output the data representative of recommendation for consideration by the customer, the recommendation including an alternate component identification and description; and apparatus from which the computer program is accessible by the online computer system.

20. The computer program product of claim 19, wherein the recommendation includes a price differential for the recommendation, the price differential being calculated with respect to a price of the customer configured computer system absent the optimize ship date recommendation.

21. The computer program product of claim 19, wherein the recommendation includes a lead time differential for the recommendation, the lead time differential being calculated with respect to a lead time of the customer configured computer system absent the optimize ship date recommendation.

22. The computer program product of claim 19, wherein the computer program is processable by the first computer system for causing the first computer system to:

receive an update selection input from the customer, the update selection input indicating customer acceptance of the recommendation; and update the configuration in response to the update selection input.

23. The computer program product of claim 19, wherein the global network includes a telephone network for communicating digital signals.

24. The computer program product of claim 23, wherein the telephone network is for communicating digital signals through a modem connection.

25. The computer program product of claim 19, wherein the global computer network includes a network selected from the group consisting of the Internet and the World Wide Web.

* * * * *